United States Patent [19]
Custodero et al.

[11] Patent Number: 5,900,449
[45] Date of Patent: May 4, 1999

[54] DIENE RUBBER COMPOSITION BASED ON ALUMINA AS REINFORCING FILLER AND ITS USE FOR THE MANUFACTURE OF A TIRE

[75] Inventors: Emmanuel Custodero, Chamalieres; Jean-Claude Tardivat, Clermont-Ferrand, both of France

[73] Assignee: Compagnie Generale des Etablissements Michelin-Michelin & Cie, Clermont-Ferrand Cedex, France

[21] Appl. No.: 08/862,830

[22] Filed: May 23, 1997

[30] Foreign Application Priority Data

May 28, 1996 [FR] France .................................. 96 06698

[51] Int. Cl.$^6$ ...................................... C08K 3/18
[52] U.S. Cl. .................. 524/430; 524/437; 524/492; 524/493; 524/495; 524/496
[58] Field of Search .................................. 524/430, 437, 524/492, 493, 495, 496

[56] References Cited

U.S. PATENT DOCUMENTS 5,227,425  7/1993  Ravline ................................. 524/493
5,580,919  12/1996  Agostini et al. ..................... 524/430

FOREIGN PATENT DOCUMENTS 0697432  2/1996  European Pat. Off. .

*Primary Examiner*—Edward J. Cain
*Attorney, Agent, or Firm*—Baker & Botts, L.L.P.

[57] ABSTRACT

A rubber composition based on at least one diene elastomer, including, as reinforcing filler, alumina which has a BET surface ranging from 30 to 400 m$^2$/g, a mean particle size smaller than or equal to 500 nm, a high proportion of Al—OH surface reactive functional groups, a high dispersibility and a coupling agent present in a quantity, expressed in moles per square meter of alumina, ranging from $10^{-7}$ to $10^{-5}$, particularly suitable for the manufacture of tires.

16 Claims, No Drawings

DIENE RUBBER COMPOSITION BASED ON ALUMINA AS REINFORCING FILLER AND ITS USE FOR THE MANUFACTURE OF A TIRE

BACKGROUND OF THE INVENTION

The present invention relates to a diene rubber composition comprising, preferably in major part, alumina as reinforcing filler, which can be employed for the manufacture of tires.

With the aim of reducing fuel consumption and the pollutants emitted by motor vehicles, great efforts have been made by tire designers to produce tires which exhibit at the same time a very low rolling resistance, improved adherence both to dry ground and to wet or snow-covered ground and very good resistance to wear.

Many solutions have been proposed for lowering the rolling resistance and improving the adherence of tires, but they are generally reflected in a very considerable loss of abrasion resistance. It is well known, in fact, to a person skilled in the art that the incorporation of conventional white fillers such as silica, alumina, bentonite, clay, kaolin, chalk, titanium oxide, talc, and the like into rubber compositions employed in the manufacture of tires and especially of treads, is undoubtedly reflected in a lowering of the rolling resistance and in an improvement in the adherence to wet, snow-covered or glare-iced ground, but also in an unacceptable loss in resistance to wear.

An effective solution to this problem has been described in Patent Application EP-A-0 501 227, which describes a sulfur-vulcanizable diene rubber composition obtained by thermomechanical working of a copolymer of a conjugated diene and of an aromatic vinyl compound prepared by solution polymerization with 30 to 150 parts by weight per 100 parts of elastomer of a specific highly dispersible precipitated silica.

Other compositions possessing such an excellent compromise between a number of contradictory properties would be of major interest to tire manufacturers who would thus have various methods of operation at their disposal. In addition, the improvement in the resistance to wear thus obtained could optionally be converted into lowering of the rolling resistance by decreasing the tread thickness. Manufacture of tires exhibiting an unaltered lifetime, but lighter and therefore consuming less energy, could thus be envisaged.

SUMMARY OF THE INVENTION

Surprisingly and unexpectedly, it has been discovered that the use of a specific alumina, known per se, can make it possible to obtain a rubber composition which can be employed for the manufacture of tires and which exhibits substantially the advantageous properties of the silica-based compositions described in Patent Application EP-A-0 501 227.

The subject of the present invention is a sulfur-vulcanizable rubber composition based on one or more diene elastomer(s) comprising, as reinforcing filler, an alumina which has a BET surface ranging from 30 to 400 $m^2g^{-1}$, a high proportion of Al—OH surface reactive functional groups, a mean particle size after ultrasonic deagglomeration smaller than or equal to 500 nm, a high dispersibility and from $10^{-7}$ to $10^{-5}$ moles/m² of alumina of a coupling agent which has a functionality capable of binding to the surface of the alumina and another capable of reacting with the elastomer chains.

Another subject of the invention is treads and tires possessing an excellent compromise of contradictory properties, namely a low rolling resistance, a good resistance to wear and an improved adherence both to dry ground and to wet or snow-covered ground.

The composition in accordance with the invention is particularly adapted to the manufacture of tire treads intended to be fitted on passenger cars, small vans, cycles and trucks, aircraft, and civil engineering, agricultural and handling machinery.

Treads comprising the composition in accordance with the invention can be employed during the manufacture of new tires or for retreading worn tires. This composition is also an advantageous solution for the other parts of the tire, in particular the belt of a radial ply casing tire, the beads, especially as bead filler rubber, or tire sidewalls because of its good hysteretic properties.

The rubber composition in accordance with the invention gives a tread not only the usual properties of the white fillers, that is to say a low rolling resistance and an improved adherence to dry, wet or snow-covered ground, but also a resistance to wear which is higher than that of the mixtures containing carbon black and substantially equal to that obtained with a highly dispersible reinforcing silica, which has the same proportion of filler per unit volume.

The alumina which can be employed as reinforcing filler in the compositions in accordance with the invention is any alumina which has a BET surface ranging from 30 to 400 $m^2g^{-1}$, and preferably from 80 to 250 $m^2g^{-1}$, a high proportion of Al—OH surface reactive functional groups, like, for example, in the aluminas of γ, δ or θ type, and preferably of γ type, a mean particle size (the term particle being taken in its generic sense) determined, after ultrasonic deagglomeration with the aid of a Vibracell Bioblock (600 W) ultrasound generator equipped with a ½-inch diameter probe, by centrifugal sedimentation smaller than or equal to 500 nm, preferably smaller than 200 nm, and a high dispersibility, that is to say sufficient for few aggregates larger than a few microns to be seen by reflection in optical microscopy on a section of rubber mix. The specific alumina selected is employed in a proportion of 20 to 300 parts by weight per hundred parts by weight of elastomer and can be employed alone or in the presence or other reinforcing fillers like, for example, carbon black or a reinforcing silica or any other filler. The improvement in the properties is proportionally greater the higher the proportion of the specific alumina in relation to the other fillers which may be present. The alumina is preferably employed in a proportion which is a majority in relation to the other fillers; the improvement in the performance being greatest when all of the filler consists of the specific alumina. For example, alumina CR 125 marketed by the Baikowski company is suitable as specific alumina which can be employed in the composition in accordance with the invention. The BET surface measurement is performed according to the Brunauer-Emmett-Teller method described in the "Journal of the American Society" Vol. 60, page 309, Feb. 1938 and corresponding to NFT standard 45007 (Nov. 1987). When the size of the alumina particles is greater than 500 nm the reinforcing activity of the alumina is very greatly reduced.

The coupling agent may be any coupling agent known in the field of reinforcement with silica, and preferably bis (triethoxysilylpropyl)tetrasulfide or Si69, marketed by Degussa. The quantity of bonding agent in relation to the quantity of alumina is between $10^{-7}$ and $10^{-5}$ moles/m² of alumina, both these limits being included, and preferably of the order of 10–6 moles/m² of alumina.

Diene elastomers capable of being used in the composition in accordance with the invention are intended to mean natural rubber, any homopolymer obtained by polymerization of a conjugated diene monomer containing from 4 to 12 carbon atoms, any binary copolymer obtained by copolymerization of one or several conjugated dienes with each other or with one or several aromatic vinyl compounds containing from 8 to 20 carbon atoms or with one or several nonaromatic monomers such as vinylpyridine, acrylonitrile, methacrylonitrile, methylmethacrylonitrile or isobutylene, or any tertiary copolymer obtained by copolymerization of ethylene and of an α-olefin containing 3 to 6 carbon atoms with an unconjugated diene monomer containing from 6 to 12 carbon atoms, like, for example, the elastomers obtained from ethylene and propylene with an unconjugated diene monomer of the above-mentioned type such as especially 1,4-hexadiene, ethylidenenorbornene or dicyclopentadiene. Conjugated dienes which are particularly suited are 1,3-butadiene, 2-methyl-1,3-butadiene, 2,3-di($C_1$–$C_5$ alkyl)-1,3-butadiene, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene and the like.

Aromatic vinyl compounds which are suitable are especially styrene, ortho-, meta- and para-methylstyrene, the commercial vinyltoluene mixture, para-tert-butylstyrene, methoxystyrenes, chlorostyrenes, vinylmesitylene, divinylbenzene, vinylnaphthalene and the like.

The copolymers may contain between 99% and 20% by weight of diene units and from 1% to 80% by weight of aromatic vinyl units or of nonaromatic monomer(s). The polymers may have any microstructure which is a function of the polymerization conditions employed, especially of the presence or absence of a modifying and/or randomizing agent and of the quantities of modifying and/or randomizing agent which are employed. The polymers may be block, random, sequential, microsequential and the like, and may be prepared in emulsion or in solution. They may, of course, be entirely or partially functionalized or may be coupled or star-shaped.

Those which are preferably suitable are polybutadienes and in particular those which have a content of 1,2 units of between 4% and 80% and those which have a content of cis-1,4 units higher than 90%, polyisoprenes and in particular 3,4-polyisoprene, butadiene-styrene copolymers and in particular those prepared in solution which have a styrene content of between 5 and 50% by weight and more particularly between 20% and 40% by weight, a 1,2 unit content in the butadiene part of between 4% and 65% and more particularly between 55% and 65%, a trans-1,4 unit content of between 15% and 80% and more particularly between 20% and 25% and which have a glass transition temperature (Tg) of between −20° C. and −30° C. In the case of butadiene-styrene-isoprene copolymers, those which are suitable have a styrene content of between 5 and 50% by weight and more particularly between 10% and 40%, an isoprene content of between 15% and 60% by weight and more particularly between 20% and 50% by weight, a butadiene content of between 5 and 50% by weight and more particularly between 20% and 40% by weight, a 1,2 unit content in the butadiene part of between 4% and 85% by weight, a trans-1,4 unit content in the butadiene part of between 6% and 80%, a 1,2 plus 3,4 unit content in the isoprene part of between 5% and 70% and a trans-1,4 unit content in the isoprene part of between 10% and 50%. To a less preferred degree, halogenated, and in particular chlorinated or brominated, butyl rubbers are also suitable. These elastomers are prepared according to the processes described in the literature and known to a person skilled in the art.

The composition in accordance with the invention also contains the other constituents and additives usually employed in rubber mixes, like plasticizers, pigments, antioxidants, sulfur, vulcanization accelerators, paraffinic, naphthenic or aromatic extender oils if the presence of an extender oil is desired, a reinforcing agent such as a silane, and the like.

The composition in accordance with the invention can be employed alone or in a blend with any other rubber composition, especially those employed for tire manufacture.

DESCRIPTION OF PREFERRED EMBODIMENTS

The invention is illustrated, without any limitation being implied, by the following 4 examples, where the final properties of the composition are expressed, on the one hand, in the form of physical properties (Examples 1 and 3) and, on the other hand, in the form of properties of radial ply casing tires of 175/70 R13 size manufactured conventionally and identical in all respects apart from the rubber composition constituting the tread (Example 2),The various properties are evaluated as follows:

The measurements are performed as shown below, and the reference value 100 is given to the values measured in the case of the control composition (1) (except for the resistance to wear), whereas the values measured in the case of the control composition (2) and the composition in accordance with the invention are established in relation to the reference value.

Adherence to snow-covered ground: determination of the behavior and of the performance of tires on various snow conditions encountered in winter road traffic.

Adherence to wet ground: determination of the time taken by a passenger car to cover a wetted track comprising various road surfacing compositions exhibiting straight lines and curves.

Rolling resistance: measured on steering wheel according to SAE standard J 12 69 of Jun. 1980. A value higher than that of the control arbitrarily set at 100 shows a decrease in the rolling resistance.

Wear lifetime: determined by the mileage (in km) covered until the wear reaches the wear indicators placed in the grooves. A value higher than reference 94 expresses an improvement in the resistance to wear.

Elongation moduli at 300% and 100%: measurements performed according to ISO standard 37. A value higher than reference 100 expresses an improvement.

Scott elongation at break measured at 100° C. Break force measured in MPa. value lower than reference 100 expresses a decrease.

Hysteretic loss: measured by rebound resilience at 60° C. A value lower than the reference shows an improvement.

Dynamic properties: Measurements as a function of the deformation: performed at 10 Hertz with a peak-to-peak deformation ranging from 0. 15% to 50%. The nonlinearity expressed is the difference in shear modulus between 0.15% and 50% deformation in MPa. The hysteresis is expressed by the measurement of tan δ at 7% deformation. A value lower than reference 100 shows an improvement.

EXAMPLE 1

In this example an alumina-filled composition is compared with two control compositions: control 1 is a conventional carbon black-based composition, control 2 is a silica-based composition. In these compositions all the parts are expressed as weight per hundred parts of elastomer:

TABLE I

| | Composition according to the invention | Control 1 | Control 2 |
|---|---|---|---|
| SBR (xx) | 100 | 100 | 100 |
| Baikowski CR 125 alumina (x) | 90 | — | — |
| N234 carbon black | — | 45 | — |
| Z1165 silica* | — | — | 50 |
| Si69 coupling agent | 4 | — | 4 |
| Stearic acid | 2.5 | 2.5 | 2.5 |
| Zinc oxide | 2.5 | 2.5 | 2.5 |
| Antioxidant (a) | 1.9 | 1.9 | 1.9 |
| Wax (b) | 1.5 | 1.5 | 1.5 |
| Sulfur | 1 | 1 | 1 |
| Sulfenamide (c) | 2 | 2 | 2 |
| Diphenylguanidine | 1.5 | 1.5 | 1.5 |

(xx) SBR solution which has a styrene content of 26%, a 1,2 bond content of 26% and a trans-1,4 bond content of 50%.
(x) CR 125 alumina marketed by the company Baikowski Chimie - France BET = 105 m$^2$/g – density = 3.67 g/cm$^3$ – $\gamma$ crystalline phase > 96%.
(*) highly dispersible silica marketed by Rhône-Poulenc.
(a) antioxidant: N-(1,3-dimethylbutyl)-N'-phenyl-p-phenylenediamine.
(b) wax: mixture of micro- and microcrystalline waxes.
(c) sulfenamide: N-cyclohexyl-2-benzothiazylsulfenamide.

Each composition is produced by thermomechanical working of the diene elastomers in an internal mixer in two stages which last 5 and 4 minutes respectively, with a mean paddle speed of 45 revolutions per minute until an identical maximum drop temperature of 160° C. is reached and which are followed by a finishing stage performed at 30° C. on an external mixer. The vulcanization of the compositions is adapted to the vulcanization kinetics of each mix.

The physical properties of the mixes are listed in Table II:

TABLE II

| Properties in the vulcanized state | Composition according to the invention | Control 1 | Control 2 |
|---|---|---|---|
| 100% modulus | 120 | 100 | 100 |
| 300% modulus | 103 | 100 | 87 |
| Scott break force | 99 | 100 | 96 |
| Scott break elongation | 99 | 100 | 99 |
| Hysteretic loss | 80 | 100 | 85 |
| ΔG at 23° C. | 75 | 100 | 89 |
| tan δ at 23° C. | 74 | 100 | 80 |

It is found that the mechanical strength of the composition in accordance with the invention is substantially close to that of the control compositions, which is favorable for the resistance to wear of a tire provided with a tread consisting of such a composition, while it exhibits hysteretic properties which are improved in relation to those of the control compositions, which is favorable for decreasing the rolling resistance of a tire provided with a tread consisting of such a composition and for forming a tread underlayer or a bead filler rubber of a tire bead or else a sidewall rubber or rim anchoring rubber.

EXAMPLE 2

In this example a tire provided with a tread consisting of a composition in accordance with the invention is compared with two tires provided with a different tread in accordance with the prior art. The tread of control 1 is produced with a carbon blackbased composition, and that of control 2 is based on a silica. As in the preceding example, all the parts of the composition are expressed as weight per hundred parts of elastomer.

TABLE III

| | Composition according to the invention | Control 1 | Control 2 |
|---|---|---|---|
| SBR/PB (xx) | 100 | 100 | 100 |
| Baikowski CR 125 alumina | 90 | — | — |
| N234 carbon black | — | 45 | — |
| Z1165 silica | — | — | 50 |
| Si69 coupling agent | 4 | — | 4 |
| Stearic acid | 1 | 1 | 1 |
| Zinc oxide | 2.5 | 2.5 | 2.5 |
| Antioxidant | 2 | 2 | 2 |
| Wax | 1.5 | 1.5 | 1.5 |
| Sulfur | 1.35 | 1.4 | 1.35 |
| Sulfenamide | 1.7 | 1.4 | 1.7 |
| Diphenylguanidine | 1.5 | — | 1.5 |

(xx) SBR solution which has a styrene content of 26%, a trans-1,4 bond content of 22%, 1,2 bond content of 60% and a Tg of –25° C. and subjected to starring with diethylene glycol according to the process described in French Patent FR-B-2 295 972.
PB polybutadiene containing 93% of cis-1,4 bonds.

The other constituents are identical with those employed in Example 1.

The compositions are processed as in Example 1 before being employed for tire manufacture.

The results are listed in Table IV.

TABLE IV

| Properties | Tire according to the invention | Control 1 | Control 2 |
|---|---|---|---|
| Adherence on wet ground | 102 | 100 | 103 |
| Adherence on snow-covered ground | 105 | 100 | 104 |
| Rolling resistance | 120 | 100 | 115 |
| Wear lifetime | 105 | 94 | 102 |

It is found that the tire which has a tread in accordance with the invention has a level of compromise between very contradictory properties which is substantially equal or even slightly superior to that obtained with the control tire including the highly dispersible silica as reinforcing filler.

EXAMPLE 3

In this example two compositions filled with aluminas in accordance with the invention A125 and D65CR (Baikowski) are compared with the following control compositions:

alumina not in accordance with the invention CR30 (Baikowski (control 3))

reference carbon black N234 (control 4)

TABLE V

| | Compositions according to the invention | | Control 3 | Control 4 |
|---|---|---|---|---|
| SBR (xx) | 100 | 100 | 100 | 100 |
| A125 alumina | 100 | — | — | — |
| D65CR alumina | — | 100 | — | — |
| CR30 alumina | — | — | 108 | — |
| N234 carbon black | — | — | — | 50 |
| Si69 coupling agent | 3.5 | 2.2 | 2.0 | — |
| Stearic acid | 2.5 | 2.5 | 2.5 | 2.5 |
| Zinc oxide | 2.5 | 2.5 | 2.5 | 2.5 |
| Antioxidant (a) | 1.9 | 1.9 | 1.9 | 1.9 |
| Sulfur | 1 | 1 | 1 | 1 |
| Sulfenamide (c) | 2 | 2 | 2 | 2 |
| Diphenylguanidine | 2 | 1.21 | 1 | — |

(xx), (a) and (c) constituents identical with those employed in Example 1.
Alumina A125 marketed by the Baikowski company (Annecy) France, BET = 106 $m^2/g$, density 3.7 $g/cm^3$, principal crystalline phase γ.
Alumina D65CR marketed by the Baikowski company: BET = 63 $m^2/g$, density 3.7 $g/cm^3$, principal crystalline phase δ with the presence of γ and θ.
Alumina CR30 marketed by the Baikowski company (Annecy), BET = 26 $m^2/g$, density 3.98 $g/cm^3$, principal crystalline phase α.

The compositions are processed as in Example 1. The curing of the compositions is adapted to the vulcanization kinetics of each mix. The physical properties of the mixes are listed in Table VI.

TABLE VI

| Properties in the vulcanized state | Compositions according to the invention | | Control 3 | Control 4 |
|---|---|---|---|---|
| | A125 | D65CR | CR30 | N234 |
| 100% modulus | 187 | 80 | 94 | 100 |
| 300% modulus | 147 | 76 | 62 | 100 |
| Scott break force | 107 | 99 | 39 | 100 |

It is found that the mechanical strength, expressed by the break force of the compositions in accordance with the invention, is substantially identical or superior to the carbon black-based control composition, while the control composition 3 not in accordance with the invention exhibits rupture properties which are clearly set back, which is highly unfavorable to the resistance to wear of a tire.

EXAMPLE 4

In this example an alumina is prepared in the laboratory according to the following process:

dissolving 94.5 g of $Al_2(SO_4)_3 \cdot 16H_2O$ (marketed by Fluka, purity>98%) in 350 g of demineralized water in a one-liter reactor thermostated at 35° C. and stirred at 400 revolutions $min^{-1}$.

suspending 72 g of $(NH_4)CO_3$(Fluka) in 150 g of demineralized water and adding to the reactor at a rate of 480 $cm^3$ $min^{-1}$. The reaction is instantaneous and produces a white precipitate; stirring is continued for 45 min.

the precipitate is next filtered off and washed with demineralized water before being dried in mild conditions the alumina (~15 g) is obtained by calcining the precipitate (3 h at 800° C. in air).

The alumina obtained has a density of 2.9 g $cm^{-3}$, a BET specific surface of 240 $m^2$ $g^{-1}$ and an object mean size after deagglomeration is 120 nm.

This alumina is compared with the following control compositions:
5 N234 reference carbon black
6 Rhone-Poulenc silica Z 1165

TABLE VII

| | Composition according to the invention | Control 5 | Control 6 |
|---|---|---|---|
| SBR (xx) | 100 | 100 | 100 |
| Alumina according to preparation | 80.8 | — | — |
| N234 carbon black | — | 50 | — |
| Z1165 silica | — | — | 58.3 |
| Si69 coupling agent | 9.7 | — | 4.7 |
| Stearic acid | 2 | 2 | 2 |
| Zinc oxide | 2.5 | 2.5 | 2.5 |
| Antioxidant (a) | 1.9 | 1.9 | 1.9 |
| Sulfur | 1.5 | 1.5 | 1.5 |
| Sulfenamide (c) | 2.5 | 2.5 | 2.5 |
| Diphenylguanidine | — | 1.2 | 2.4 |

(xx), (a) and (c) constituents identical with those employed in Example 1.

The compositions are processed as in Example 1. The curing of the compositions is adapted to the vulcanization kinetics of each mix. The physical properties of the mixes are listed in Table VIII.

TABLE VIII

| | Composition according to the invention | Control 5 | Control 6 |
|---|---|---|---|
| 100% modulus | 135 | 100 | 102 |
| Scott breaking force | 97 | 100 | 102 |

It is found that the mechanical properties of the composition in accordance with the invention are substantially identical with or superior to those of the control compositions based on carbon black or silica.

We claim:

1. A rubber composition based on one or more diene elastomer(s), including alumina and a coupling agent, characterized in that the alumina is employed as reinforcing filler, has a BET surface ranging from 30 to 400 $m^2/g$, a mean particle size after ultrasonic deagglomeration smaller than or equal to 500 nm, a high proportion of Al—OH surface reactive functional groups and a high dispersibility and in that the quantity of coupling agent, expressed in moles per square meter of alumina is between $10^{-7}$ and $10^{-5}$, both these values being included.

2. A composition according to claim 1, characterized in that the alumina is present in a proportion of 20 to 300 parts by weight per 100 parts by weight of elastomer.

3. A composition according to claim 2, characterized in that the BET surface of the alumina ranges from 80 to 250 $m^2/g$.

4. A composition according to claim 1, characterized in that the mean size of alumina particles is equal to or smaller than 200 nm.

5. A composition according to claim 1, characterized in that the quantity of coupling agent is approximately $10^{-6}$ moles/$m^2$ of alumina.

6. A composition according to claim 1, characterized in that the alumina represents at least 50% of the reinforcing filler.

7. A rubber composition based on one or more diene elastomer(s), including alumina and a coupling agent, characterized in that the alumina is employed as reinforcing filler, has a BET surface ranging from 30 to 400 m²/g, a mean particle size after ultrasonic deagglomeration smaller than or equal to 500 nm, a high proportion of Al—OH surface reactive functional groups and a high dispersibility and in that the quantity of coupling agent, expressed in moles per square meter of alumina is between $10^{-7}$ and $10^{-5}$, both these values being included, further characterized in that the alumina represents all of the reinforcing filler.

8. A composition according to claim 6, characterized in that, besides the alumina, it includes silica as reinforcing filler.

9. A composition according to claim 8 in which the silica is highly dispersible.

10. A composition according to claim 1, characterized in that the diene elastomer(s) is/are chosen from natural rubber, homopolymers of conjugated dienes and copolymers of conjugated dienes with each other or with one or several aromatic vinyl compounds which may optionally be functionalized, branched or coupled.

11. A composition according to claim 10, characterized in that the diene elastomer is a butadiene-styrene copolymer or a blend of a butadiene-styrene copolymer and of a polybutadiene containing more than 90% of cis-1,4 bonds.

12. A composition according to claim 11, characterized in that the butadiene-styrene copolymer is prepared in solution and has a styrene content of between 20% and 40% by weight, a vinyl bond content in the butadiene part of between 55% and 65%, a trans-1,4 bond content of between 20% and 25% and a glass transition temperature of between −20° C. and −30° C.

13. A tire characterized in that it includes a rubber composition based on one or several diene elastomer(s), a reinforcing filler containing of alumina which has a mean particle size after ultrasonic deagglomeration equal to or smaller than 500 nm, a high proportion of Al—OH surface reactive functional groups, a high dispersibility and a BET surface ranging from 30 to 400 m²/g, and a coupling agent present in a quantity, expressed in moles per square meter of alumina, ranging from $10^{-7}$ to $10^{-5}$.

14. A tire according to claim 13, characterized in that the alumina represents all of the reinforcing filler.

15. A tire according to claim 14, characterized in that the diene rubber composition forms part of the constitution of the tread.

16. A tire according to claim 15 in which the diene rubber composition constitutes all of the tread.

* * * * *

UNITED STATES PATENT AND TRADEMARK OFFICE
CERTIFICATE OF CORRECTION

PATENT NO.   : 5,900,449  
DATED        : May 4, 1999  
INVENTOR(S)  : Custodero et al.

Page 1 of 1

It is certified that error appears in the above-identified patent and that said Letters Patent is hereby corrected as shown below:

Title Page:

Item [56] References Cited, FOREIGN PATENT DOCUMENTS: Insert -- 0272071 6/1988 European Pat. Off. --

Claims:

Column 10,
Line 9: "containing of" should read -- containing --

Specification:

Column 2,
Line 67: "10-6" should read -- 10-6 --

Column 3,
Line 16: "ethylidenenorbomene" should read -- ethylidenenorbornene --

Column 6,
Line 2: "blackbased" should read -- black-based --

Signed and Sealed this

Fourteenth Day of August, 2001

*Attest:*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 5,900,449
DATED : May 4, 1999
INVENTOR(S) : Custodero et al.

Page 1 of 1

It is certified that error appears in the above-identified patent and that said Letters Patent is hereby corrected as shown below:

Column 2,
Line 67, " "10-6" should read -- $10^{-6}$ --

Signed and Sealed this

Fourth Day of December, 2001

Attest:

*Attesting Officer*

NICHOLAS P. GODICI
*Acting Director of the United States Patent and Trademark Office*